United States Patent

[11] 3,592,536

[72] Inventors Gunars Licitis
Lombard;
Marvin I. Glass, Chicago, both of, Ill.
[21] Appl. No. 884,064
[22] Filed Dec. 11, 1969
[45] Patented July 13, 1971
[73] Assignee Marvin Glass & Associates
Chicago, Ill.

[54] STEREOSCOPIC TRANSPARENCY UNIT WITH ANIMATION
7 Claims, 3 Drawing Figs.

[52] U.S. Cl. .................................................. 352/57,
40/70, 40/106.53
[51] Int. Cl. .................................................. G03b 35/26
[50] Field of Search ........................................ 352/57, 32;
353/7, 129, 120; 40/106.51, 106.52, 106.53;
350/132, 153, 159

[56] References Cited
UNITED STATES PATENTS
2,977,845 4/1961 Boone ............... 40/106.53 X
3,104,273 9/1963 Ballance ............ 40/106.53 UX

*Primary Examiner* — Donald O. Woodiel
*Attorney* — James F. Coffee

ABSTRACT: A stereoscopic transparency holder unit which provides for animation of the illustrations on photographic transparencies. The unit includes a circular disc mounting a plurality of pairs of photographic transparencies adjacent the outer circumferential portion of the disc, and a rotatable circular member is disposed in coaxial arrangement with the disc and includes polarizing material overlying the path of the transparency. The transparencies include polarizing segments or portions, and as the circular member is rotated during the viewing of the transparencies there is a resulting animation of the illustration being viewed.

PATENTED JUL 13 1971  3,592,536

INVENTORS
GUNARS LICITIS
MARVIN I. GLASS

BY James F. Coffee
ATTORNEY 3,592,536

STEREOSCOPIC TRANSPARENCY UNIT WITH ANIMATION

BACKGROUND OF THE INVENTION

The present invention relates generally to a mounting unit for stereoscopic transparencies and is particularly directed to means for providing animation of the illustration on stereoscopic transparencies. More particularly, the present invention is directed to a combined sound record and stereoscopic transparency holder which utilizes polarization of light to provide animation of the picture.

The unit disclosed and claimed herein is an improvement of the "Audio-Visual Unit" in U.S. Pat. No. 3,432,230, which was issued Mar. 11, 1969 to the assignee of the present invention. A stereoscopic viewer adapted to utilize the stereoscopic transparency holder of the present invention is fully disclosed in pending application Ser. No. 555,200, filed June 3, 1966 and assigned to the assignee of the present invention.

One of the most popular forms of stereoscopic viewers is shown in U.S. Pat. No. 2,511,334 and utilizes a circular disc having the transparencies arranged in pairs adjacent the periphery of the disc. This viewer has provided the basis for a more recent development, wherein sound reproducing mechanism has been included in the viewer for cooperation with a record rotatably mounted on the transparency holder. The record is translucent in order that it may overlie the transparencies without seriously restricting the passage of light through the transparencies being viewed.

SUMMARY OF THE INVENTION

The present invention is particularly directed toward a further novel arrangement for a stereoscopic viewer, whereby animation is provided for the transparencies while the transparencies are being viewed in a stationary position. A more detailed object of the invention is to provide a circular transparency holder, wherein the transparencies are arranged in diametrically opposed pairs adjacent the periphery of the holder and polarizing segments are included on the transparencies, with a relatively rotatable disc disposed coaxially with the holder and including polarizing material overlying the path of the transparencies. A further object of the invention is to provide such a unit with a sound recording on the rotatable disc, so as to combine both animation and sound with the viewing of the stereoscopic transparencies.

Other objects and advantages will be apparent from the following description of the selected embodiment of the invention.

Figure 1:
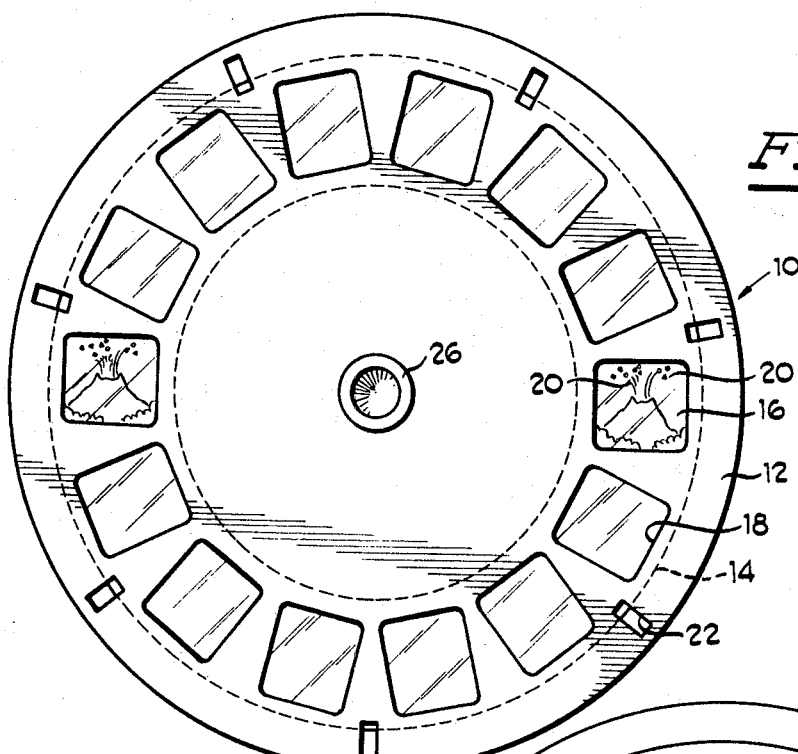
FIG. 1 is an elevational view of the transparency holder unit taken from the transparency side of the unit.
Figure 2:
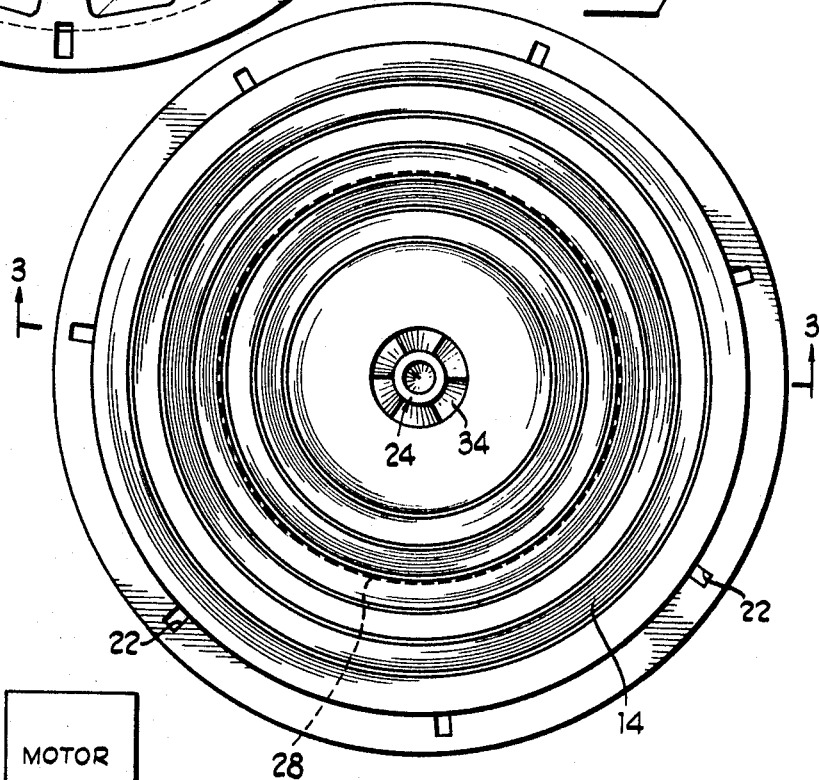
FIG. 2 is an elevational view of the transparency holder unit taken from the side opposing that seen in FIG. 1 and particularly illustrating the rotatable polarized disc or record.

The selected embodiment comprises a stereoscopic transparency unit 10 including a circular transparency holder 12, and a translucent record 14 rotatably mounted on the center of the holder. The transparency holder 12 is of any suitable material but is preferably a lamination of paper and aluminum, with the paper covering the opposite faces of the disc and includes photographic transparencies 16 mounted in openings 18 formed around the holder 12. The transparencies 16 are arranged in pairs with the nearly identical but stereoptically photographed pictures of each pair being disposed in diametrical alignment at opposite edges of the holder 12, so as to provide a stereoscopic view of the picture in a manner well known in the art. Each of the transparencies has had added thereto portions or segments 20 of polarizing materials.

Figure 3:
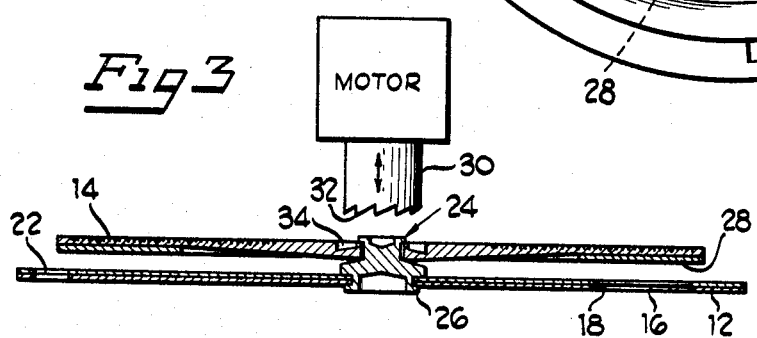
FIG. 3 is a sectional view taken generally along the line 3–3 in FIG. 2, with the addition of a diagrammatical showing of motor means for effecting rotation of the record.

The marginal portion of the holder 12 includes small, slotted openings 22, which are adapted to be engaged by a rotatable drive plate in the viewer (not shown) for sequentially moving the pairs of pictures into view. The disc or sound record 14 is circular and made of a translucent material, preferably transparent, such as clear vinyl or other suitable plastic. The record preferably includes a plurality of individual messages, each of which is pertinent to the subject matter of one of the pairs of transparencies 16. The center of the record 14 is rotatably secured in coaxial arrangement with the holder by a rivetlike fastening element 24 having one end portion 26 firmly gripping the transparency holder and the other end providing a bearing for free rotation of the record 14. At least one surface of the record is coated, laminated or otherwise provided with a layer of polarizing material 28. The polarizing material may extend over the entire area of the record, or it may be an annular coating or lamination adjacent the outer edge of the record in position to constantly overly the transparencies, as indicated in FIG. 3. It will be understood, of course, that the provision of a sound recording on the rotatable disc 14 is not essential to provide animation of the illustration on the transparencies. If sound is not desired, the entire rotatable disc 14 may be made of a sheet of polarizing material, or polarizing material may be coated or laminated on either or both of the two sides of the translucent disc.

While other forms of drive means might be provided to effect rotation of the polarized, translucent disc 14 relative to the transparency holder 12, FIG. 3 illustrates diagrammatically a form of drive which is disclosed more fully in the pending application, Ser. No. 555,200, wherein a motor driven shaft 30 having one or more serrations 32 on its free end is movable into and out of engagement with the hub portion 34 of the rotatable disc. The hub 34 of disc 14 includes one or more arcuate segments, which are inclined to mate with the serrations 32 on the drive shaft 30, when the two are in contact, to thereby provide a driving engagement between the shaft 30 and the disc 14.

The rotation of the polarized disc 14 relative to the polarized segments 20 on the transparencies, accompanied by the passage of light through the transparencies and polarized disc 14, provides the illusion of motion on the transparencies at the position of deposit of the polarizing material 20 on the transparencies. The polarizing material may be of any known composition, such as iodide crystals or calcite crystals, and such material is preferably arranged on the transparency in identical positions relative to the remainder of the illustration so as to provide the same stereoscopic effect in viewing.

Although shown and described with respect to particular structure, it will be apparent that various modifications might be made without departing from the principles of the invention.

What we claim is:

1. A stereoscopic transparency unit providing for animation of the illustrations carried thereby, comprising a generally planar disc including openings therethrough mounting a plurality of pairs of photographic transparencies adjacent the outer circumferential portion of said disc, at least one of said pairs of transparencies including polarizing segments, and a translucent circular member mounted on said disc in coaxial relation thereto for free rotation relative to said disc, said circular member including polarizing material overlying the path of said transparencies, whereby rotation of said circular member relative to said transparencies, accompanied by the passage of light through said member and pair of transparencies, provides animation of the illustration in said transparencies.

2. A stereoscopic transparency unit as set forth in claim 1, wherein said circular member is provided with an annular driving means surrounding its center axis.

3. A stereoscopic transparency unit as set forth in claim 1, wherein said circular member is a sound record having a sound message recorded on the surface which faces outwardly of said disc.

4. A stereoscopic transparency unit as set forth in claim 3, including a plurality of separate sound messages on said circular member, each of which is related to the illustration on one of said pairs of transparencies.

5. A stereoscopic transparency unit as set forth in claim 1, wherein said circular member is a sheet of polarizing material.

6. A stereoscopic transparency unit as set forth in claim 1, wherein an annular sheet of polarizing material is secured to said circular member in position to overlie said transparencies on said disc.

7. A stereoscopic transparency unit as set forth in claim 1, wherein said circular member is coated with polarizing material on the surface of said member facing said disc.